(12) United States Patent
LaFon et al.

(10) Patent No.: US 8,635,009 B2
(45) Date of Patent: Jan. 21, 2014

(54) METHOD FOR CREATION OF A TAXIING ROUTE OVER AN AIRPORT AREA AND ASSOCIATED DEVICE

(75) Inventors: Stéphanie LaFon, Merignac (FR); François Michel, Saint Medard en Jalles (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 13/492,781

(22) Filed: Jun. 8, 2012

(65) Prior Publication Data

US 2012/0316766 A1    Dec. 13, 2012

(30) Foreign Application Priority Data

Jun. 10, 2011    (FR) ...................................... 11 01785

(51) Int. Cl.
*G06F 19/00*    (2011.01)

(52) U.S. Cl.
USPC ........................................................ 701/120

(58) Field of Classification Search
USPC ........ 701/3, 16, 120, 409, 454, 532, 533, 538
See application file for complete search history.

(56) References Cited

U.S. PATENT DOCUMENTS

| | | | |
|---|---|---|---|
| 5,272,638 A | 12/1993 | Martin et al. | |
| 5,374,932 A | 12/1994 | Wyschogrod et al. | |
| 6,161,062 A | 12/2000 | Sicre et al. | |
| 6,232,602 B1 | 5/2001 | Kerr | |
| 6,373,055 B1 | 4/2002 | Kerr | |
| 6,405,107 B1 | 6/2002 | Derman | |
| 6,411,890 B1 | 6/2002 | Zimmerman | |
| 6,571,166 B1 | 5/2003 | Johnson et al. | |
| 6,694,249 B1 | 2/2004 | Anderson et al. | |
| 6,731,226 B2 | 5/2004 | Walter | |
| 6,806,469 B2 | 10/2004 | Kerr | |
| 7,102,130 B2 | 9/2006 | Kerr | |

(Continued)

FOREIGN PATENT DOCUMENTS

| | | |
|---|---|---|
| CA | 976 645 A | 10/1975 |
| CA | 2 613 740 | 1/2007 |

(Continued)

OTHER PUBLICATIONS

French Search Report for Counterpart French Application No. 1101785, 7 pgs. (Feb. 28, 2012).

(Continued)

*Primary Examiner* — Kim T Nguyen
(74) *Attorney, Agent, or Firm* — Blakely, Sokoloff, Taylor & Zafman LLP

(57) ABSTRACT

Systems and of the methods for allowing a taxiing route to be established over an airport area are described. In one embodiment, the method comprises input of an instruction representative of a succession of names of passing points representing the taxiing route to be created, each passing point name being composed of alphanumeric characters, the succession of the names of passing points not comprising separators allowing them to be identified one by one. The method also comprises decomposition of the instruction by a lexical analysis device into at least one succession of credible names of passing points. The method further comprises verification for each succession that the corresponding route is compatible with the connectivities existing between the various airport elements of the taxiing clearance corresponding to the succession, in the case where there exists one and only one credible route, display of the said route on a display device.

10 Claims, 2 Drawing Sheets

(56) References Cited

U.S. PATENT DOCUMENTS

| | | |
|---|---|---|
| 7,280,896 B2 | 10/2007 | Morizet et al. |
| 7,308,343 B1 | 12/2007 | Horvath et al. |
| 7,382,284 B1 | 6/2008 | Armstrong et al. |
| 7,382,288 B1 | 6/2008 | Wilson |
| 7,522,977 B2 | 4/2009 | Foucart et al. |
| 7,567,187 B2 | 7/2009 | Ramaiah et al. |
| 7,844,392 B2 | 11/2010 | Dubourg |
| 8,125,352 B2 | 2/2012 | Dubourg et al. |
| 2002/0099528 A1 | 7/2002 | Hett |
| 2002/0120392 A1 | 8/2002 | Stratton et al. |
| 2004/0006412 A1 | 1/2004 | Doose et al. |
| 2004/0056952 A1 | 3/2004 | Konya |
| 2004/0059497 A1 | 3/2004 | Sankrithi |
| 2004/0160354 A1 | 8/2004 | Coldefy et al. |
| 2005/0015202 A1 | 1/2005 | Poe et al. |
| 2005/0190079 A1 | 9/2005 | He |
| 2007/0168111 A1 | 7/2007 | Dubourg |
| 2007/0250224 A1 | 10/2007 | Dwyer |
| 2008/0162092 A1 | 7/2008 | Coulmeau et al. |
| 2008/0191903 A1 | 8/2008 | Dubourg et al. |
| 2008/0270784 A1 | 10/2008 | Bonnet et al. |
| 2008/0275642 A1 | 11/2008 | Clark et al. |
| 2009/0001871 A1 | 1/2009 | Song |
| 2009/0018713 A1* | 1/2009 | Coulmeau et al. ............ 701/3 |
| 2010/0003929 A1 | 1/2010 | Sohn et al. |
| 2010/0039295 A1 | 2/2010 | Dubourg et al. |
| 2010/0107292 A1 | 5/2010 | Chevallier et al. |
| 2010/0114922 A1 | 5/2010 | Gayraud |
| 2010/0125403 A1 | 5/2010 | Clark et al. |
| 2010/0198489 A1 | 8/2010 | Rozovski et al. |
| 2010/0324807 A1* | 12/2010 | Doose et al. ............ 701/120 |
| 2011/0046868 A1 | 2/2011 | Michel et al. |
| 2011/0125400 A1 | 5/2011 | Michel et al. |
| 2011/0246003 A1 | 10/2011 | Lafon et al. |
| 2011/0257873 A1 | 10/2011 | Lussiez et al. |
| 2012/0215385 A1 | 8/2012 | He et al. |

FOREIGN PATENT DOCUMENTS

| | | |
|---|---|---|
| DE | 10 2006 062061 A1 | 7/2008 |
| EP | 1 988 365 A2 | 11/2008 |
| FR | 2 884 021 A1 | 10/2006 |
| FR | 2 888 342 A1 | 1/2007 |
| FR | 2 891 644 A | 4/2007 |
| FR | 2 891 646 A | 4/2007 |
| FR | 2 919 416 A1 | 1/2009 |
| FR | 2 922 072 A1 | 4/2009 |
| WO | WO 97/14114 A1 | 4/1997 |
| WO | WO 99/04304 A1 | 1/1999 |
| WO | WO 03/048888 A | 6/2003 |
| WO | WO 2007/006762 A2 | 1/2007 |
| WO | WO 2008/043763 A1 | 4/2008 |
| WO | WO 2009/016135 A1 | 2/2009 |

OTHER PUBLICATIONS

Jon Koeners, et al.,"Pictorial representation of ATC instructions for airport surface operations: design and evaluation," Digital Avionics Systems, 2001. DASC. 20th Conference, vol. 1, pp. 2D5/1-2D5/10 (2001).

RTCA DO272/Eurocae ED99, "Users Requirements for Aerodome Mapping Information," Paris, France, www.eurocae.org, pp. 1-125 (Oct. 2005).

* cited by examiner

METHOD FOR CREATION OF A TAXIING ROUTE OVER AN AIRPORT AREA AND ASSOCIATED DEVICE

BACKGROUND OF THE INVENTION

1. Field of the Invention

The field of the invention is that of the flow of aircraft traffic over the airport areas before they takeoff or after they have landed and of the electronic and data processing means allowing the route to be followed over these areas to be indicated to the crews.

2. Description of the Prior Art

Conventionally, during taxiing phases over an airport area, the pilots receive taxiing instructions from the air traffic control or ATC. FIG. 1 shows a partial plan view of an airport area Z. In this area, the aircraft A situated on the taxiway B must get to the takeoff runway "27L" appearing in black in FIG. 1. The pilot will receive a taxiing instruction indicating to him for example to go via the taxiways "BD20" and "Y11". An ATC instruction authorizing the taxiing is also called taxiing clearance. These instructions give pilots the authorization to taxi up to a certain point without fear of any conflict with another aircraft or another vehicle. The ATC communicates this information by voice and the pilots remember it and may write it down on paper or in a text input area, such as a "scratchpad", of an electronic control unit. This unit can be an MCDU, acronym for "Multi Control Display Unit". The pilots then use paper maps to locate themselves within the airport area and follow the route indicated.

Currently, some onboard systems can calculate the route to be followed based on these instructions and display this route on electronic airport maps in order to simplify the navigation task of the pilots. The system must therefore recognize the clearances perfectly in order to be able to process them and display them.

Several solutions are possible for inputting the clearances. Indeed, the clearance can be entered into the system:
- Either automatically, by receiving the information needed for the display of the clearance via a digital link or by voice recognition;
- Or through manual intervention by the pilot. In the latter case, he inputs the ATC instruction as a text which is then interpreted by the system and then displayed on the map. The input operation can be carried out on a touch screen and read by a writing recognition system or more simply, the input can be done on an alphanumeric keyboard.

In the case of a manual intervention by the pilot, inputting on an alphanumeric keyboard offers the advantage of being able to use editing means such as the MCDU units already present on many aircraft.

In general, the taxiing instructions indicate the destination which, by way of example, might be "holding position", "stand", "runway" then the route to be followed composed of names of taxiways. Thus, an instruction generally takes the following form:
TAXI TO [Halt Position] VIA [Specific Route to be Followed]

In order to input an instruction without ambiguities, this instruction must be input by introducing a separator between each airport element so as to allow the system to easily find it and without errors in a database. For example, the instruction ATC: "TAXI TO stand E10 VIA taxiways T40, T41 and M2" corresponds to the pilot inputting the following: "E10-T40-T41-M2". However, the addition of a separator between each element adds a workload for the pilot who runs the risk of not having the time to input the complete instruction dictated to him by the ATC.

SUMMARY OF THE INVENTION

The object of the invention is to provide means and a method allowing the separators in the input carried out by the pilot to be partially or totally eliminated from the ATC instructions. In this case, the system must demonstrate a certain intelligence in order to reconstruct the route starting from indistinctive elements input by the pilot.

More precisely, the first subject of the invention is a method for creation of a taxiing route over an airport area comprising at least the following steps:
Step 1: Input by a user by means of an alphanumeric input device of an instruction representative of a succession of names of airport elements called passing points representing the taxiing route to be created, each passing point name being composed of alphanumeric characters, the succession of these names not comprising all of the separators allowing them to be identified one by one;
Step 2: Decomposition of the instruction by a lexical analysis device into at least one succession of credible names of passing points, a credible name effectively corresponding to a name of a taxiing element or stopping point of the airport area included in an airport database;
Step 3: In the case where there exist at least two successions of credible names, verification for each succession that the corresponding route is compatible with the connectivities existing between the various airport elements;
Step 4: In the case where, following steps 2 or 3, there exists one and only one credible route, in other words a route both corresponding to credible names of passing points and compatible with the connectivities existing between the various elements of the airport, display of the said route on a display device.

Advantageously, the routes established in step 3 of the method are generated by means of a connection graph for the elements of the airport area, each corresponding airport element being described by a polygon, each polygon being defined in an airport database by a name, a type, a set of segments and a set of connection points, each connection point corresponding to a common border with another polygon, all of the segments connecting the connection points of each polygon forming the connection graph.

The invention also relates to a system for creation of a taxiing route over an airport area allowing the preceding method to be implemented, characterized in that the said system comprises:
An alphanumeric input device;
A lexical analysis device connected to a lexicon of the airport elements of the said airport area;
A route calculation device connected to a database comprising a connection graph for the elements of the airport area;
A device for displaying the taxiing route and the airport area.

Advantageously, the alphanumeric input device is an electronic unit "MCDU" or an alphanumeric input device using writing recognition or an alphanumeric input device using voice recognition.

BRIEF DESCRIPTION OF THE DRAWINGS

The invention will be better understood and other advantages will become apparent upon reading the description that follows presented by way of non-limiting example and with regard to the appended figures amongst which.

DETAILED DESCRIPTION

Figure 1:
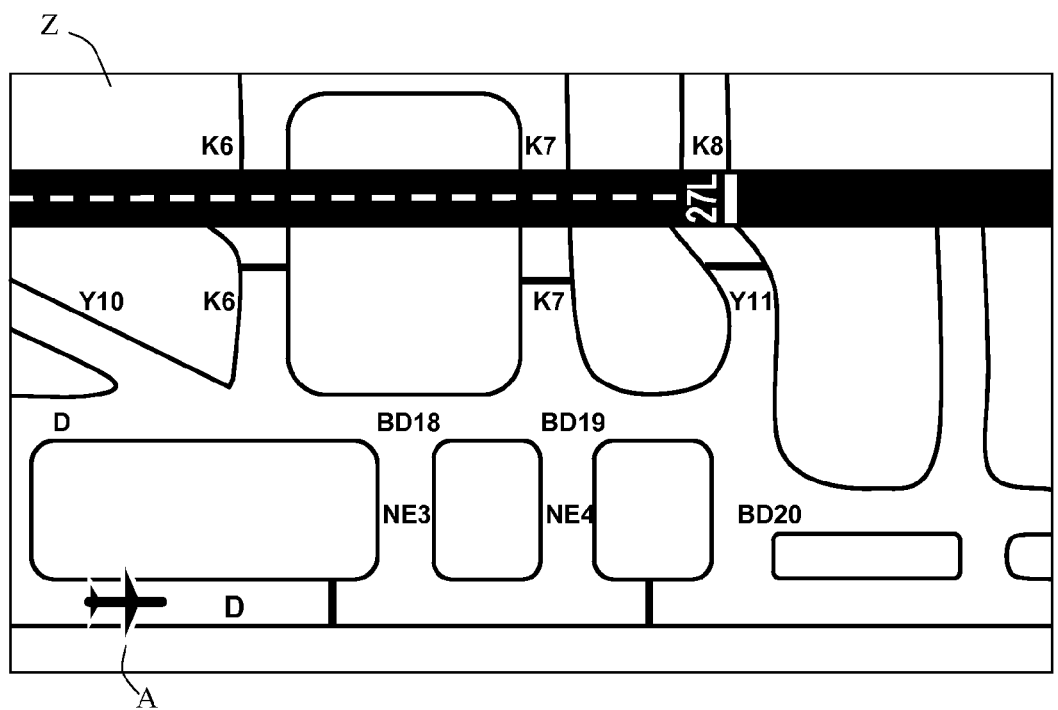
FIG. 1, already described, shows a plan view of an airport area with its various clearances.
Figure 2:
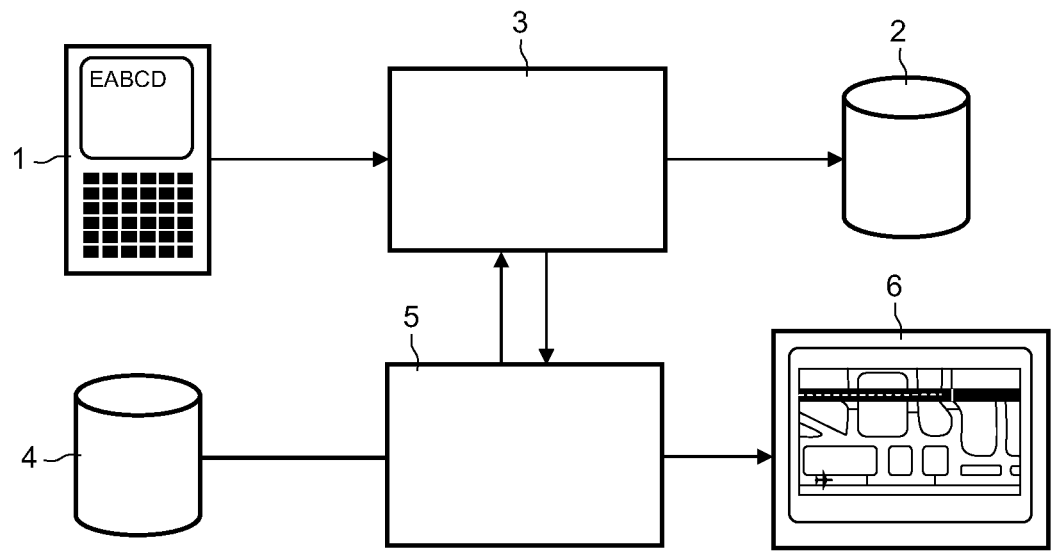
FIG. 2 shows a schematic diagram of a system for creation of a taxiing route over an airport area according to the invention.

The system for creation of a taxiing route over an airport area according to the invention is shown in FIG. 2. It comprises the following elements:

- A device 1 allowing clearances to be input in text form. Various types of these exist. By way of examples, the electronic unit "MCDU" in the cockpit or a touch device using writing recognition or again an alphanumeric input device using voice recognition;
- A lexicon 2 of all the names of airport elements of the airport area that an aeroplane can use. It comprises the various names of taxiways, of runways, the stopping points, etc.
- A lexical analysis device 3 allowing the text-based clearances to be interpreted so as to position separators between them in such a manner that all the names of clearances belong to the preceding lexicon 2;
- A database 4 describing the network of taxiways of the airport and their interconnections. In the French Patent FR 2 919 416 entitled "Methods for generation of a connectivity graph of elements of an airport as a taxiing aid and associated devices" a method will be found allowing this type of graph to be established from an airport database. This method is based on the generation of a graph composed of connection segments. The graph is established in the following manner. Each airport element dedicated to the taxiing is associated with an element described by a polygon. Each polygon is defined in an airport database by a name, a type, a set of segments and a set of connection points. Each connection point corresponds to a common border with another polygon, all of the connection segments connecting the connection points of each polygon form the connection graph;
- A device 5 allowing the calculation of routes from a text-based clearance with separators by means of conventional graph path algorithms of the "Dijkstra" type;
- A device 6 for displaying the routes found and the airport area. The display device is one of the screens of the instrument control panel or of the head-up displays. The display can be a plan view or a perspective view. The route can be shown graphically or in text form by the display of all of these passing points.

Figure 3:
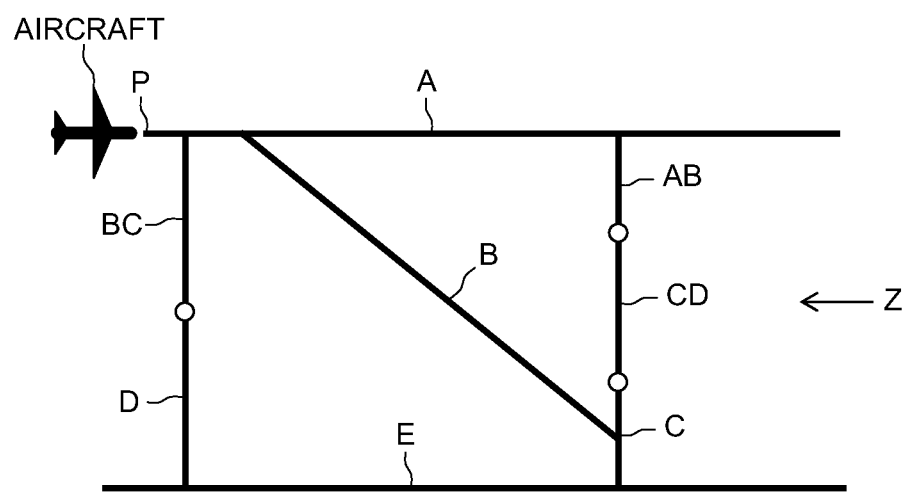
FIG. 3 shows a connection graph representative of the possible routes inside of the airport area.

By way of example and for a comprehensive understanding of the method for creation of a taxiing route over an airport area according to the invention implemented by means of the preceding system, FIG. 3 shows a simplified airport area Z in which an aircraft AIRCRAFT is located at a point P of the area and must get to the runway E. As indicated in FIG. 3, the area comprises the taxiway elements A, AB, CD, C, BC, D, B and E. The ATC gives the following instruction to the pilot: Go to E passing successively via A, BC, D and E.

As has been said, the method for creation of a taxiing route according to the invention comprises four main steps.

The first step consists, for the user, in inputting by means of the alphanumeric input device 1 an instruction representative of the succession of passing points representing the taxiing route to be created. Generally speaking, this instruction begins with the goal to be reached, in this case E, then the pilot successively inputs the intermediate clearances which are in the present case A, BC and D. As has been said, if these various elements are separated by a separator, the instruction is interpretable without ambiguities. If the pilot does not input any separators—for example, if the instruction input is EABCD—there exist various possible routes corresponding to this instruction. In this case, the method goes to the second step.

In the second step, the lexical analysis device 3 decomposes the instruction input into several successions of credible names of passing points, a credible name effectively corresponding to a name of an element of the airport area in the lexicon 2. In the case of FIG. 3, the lexical analysis device 3 will find the five following credible successions: E-A-B-C-D; E-A-B-CD; E-A-BC-D; E-AB-C-D and lastly E-AB-CD. As there are several possible routes, the method goes to the third step.

In the third step, using the database 4, the route calculation device 5 checks, for each possible succession, that the corresponding route is compatible with the connectivities existing between the various clearances of the succession. In the present case, as can be seen in FIG. 3, only the second succession E-A-BC-D is possible. It is the only succession in which the passing points follow each other in a continuous fashion, and it really does correspond to the initial instruction from the ATC. The fourth step is then carried out.

In the fourth step, as long as, following the second and the third steps, there exists one and only one credible route, in other words a route both corresponding to credible names of passing points and compatible with the connectivities existing between the various elements of the airport, the system displays the single route found on the display device 6. Of course, if the method does not find any route or, on the contrary, finds several of them, the pilot is warned that there is a problem. He must then verify the instruction input and, where necessary, modify it.

What is claimed is:

1. Method for creation of a taxiing route over an airport area described in a database comprising a network of various airport elements and their interconnections, the method comprising at least the following operations:

Operation 1: Input by a user by means of an alphanumeric input device of an instruction representative of a succession of airport elements called passing points, representing the taxiing route to be created, each passing point name being composed of alphanumeric characters, the succession of these names not comprising separators allowing the succession of these names to be identified one by one;

Operation 2: Decomposition of the instruction by a lexical analysis device into at least one succession of credible names of passing points, a credible name effectively corresponding to a name of an element of the airport area;

Operation 3: In the case where there exist at least two successions of credible names of passing points, verification for each succession that a corresponding route is compatible with one or more connectivities existing between the various airport elements of the succession;

Operation 4: In the case where, following Operations 2 or 3, there exists one and only one credible route, in other words a route both corresponding to the credible names of passing points and compatible with the connectivities existing between the various airport elements, display of said route on a display device.

2. Method for creation of a taxiing route over an airport area according to claim 1, wherein one or more corresponding routes in the operation 3 are generated by means of a connection graph for the elements of the airport area, each corresponding route being associated with a succession of airport elements, each corresponding airport element being described by a polygon, each polygon being defined in an airport database by a name, a type, a set of segments and a set of connection points, each connection point corresponding to a common border with another polygon, all of the segments connecting the connection points of each polygon forming the connection graph.

3. System for creation of a taxiing route over an airport area allowing implementation of a method for creation of a taxiing route over an airport area described in a database comprising a network of various airport elements and their interconnections, said method comprising at least the following operations:

Operation 1: Input by a user by means of an alphanumeric input device of an instruction representative of a succession of airport elements called passing points, representing the taxiing route to be created, each passing point name being composed of alphanumeric characters, the succession of these names not comprising separators allowing the succession of these names to be identified one by one;

Operation 2: Decomposition of the instruction by a lexical analysis device into at least one succession of credible names of passing points, a credible name effectively corresponding to a name of an element of the airport area;

Operation 3: In the case where there exist at least two successions of credible names of passing points, verification for each succession that a corresponding route is compatible with one or more connectivities existing between the various airport elements of the succession;

Operation 4: In the case where, following operations 2 or 3, there exists one and only one credible route, in other words a route both corresponding to credible names of passing points and compatible with the connectivities existing between the various airport elements, display of the said route on a display device, wherein said system comprises:

An alphanumeric input device;

A lexical analysis device connected to a lexicon of the airport elements of said airport area;

A route calculation device connected to a database comprising a connection graph for the elements of the airport area;

A device for displaying the taxiing route and the airport area.

4. System for creation of a taxiing route over an airport area according to claim 3, wherein the alphanumeric input device is an electronic unit "MCDU".

5. System for creation of a taxiing route over an airport area according to claim 3, wherein the alphanumeric input device uses writing recognition.

6. System for creation of a taxiing route over an airport area according to claim 3, wherein the alphanumeric input device uses voice recognition.

7. System for creation of a taxiing route over an airport area allowing implementation of a method for creation of a taxiing route over an airport area described in a database comprising a network of various airport elements and their interconnections, said method comprising at least the following operations:

Operation 1: Input by a user by means of an alphanumeric input device of an instruction representative of a succession of airport elements called passing points, representing the taxiing route to be created, each passing point name being composed of alphanumeric characters, the succession of these names not comprising separators allowing the succession of these names to be identified one by one;

Operation 2: Decomposition of the instruction by a lexical analysis device into at least one succession of credible names of passing points, a credible name effectively corresponding to a name of an element of the airport area;

Operation 3: In the case where there exist at least two successions of credible names of passing points, verification for each succession that a corresponding route is compatible with one or more connectivities existing between the various airport elements of the succession;

Operation 4: In the case where, following operations 2 or 3, there exists one and only one credible route, in other words a route both corresponding to credible names of passing points and compatible with the connectivities existing between the various airport elements, display of the said route on a display device, wherein one or more corresponding routes in the operation 3 are generated by means of a connection graph for the elements of the airport area, each corresponding route being associated with a succession of airport elements, each corresponding airport element being described by a polygon, each polygon being defined in an airport database by a name, a type, a set of segments and a set of connection points, each connection point corresponding to a common border with another polygon, all of the segments connecting the connection points of each polygon forming the connection graph, wherein said system comprises:

An alphanumeric input device;

A lexical analysis device connected to a lexicon of the airport elements of the said airport area;

A route calculation device connected to a database comprising a connection graph for the elements of the airport area;

A device for displaying the taxiing route and the airport area.

8. System for creation of a taxiing route over an airport area according to claim 7, wherein the alphanumeric input device is an electronic unit "MCDU".

9. System for creation of a taxiing route over an airport area according to claim 7, wherein the alphanumeric input device uses writing recognition.

10. System for creation of a taxiing route over an airport area according to claim 7, wherein the alphanumeric input device uses voice recognition.

* * * * *